United States Patent [19]

Futagawa

[11] Patent Number: 4,950,347
[45] Date of Patent: Aug. 21, 1990

[54] METHOD FOR WELDING THERMOPLASTIC RESIN

[75] Inventor: Hitoshi Futagawa, Otsu, Japan

[73] Assignee: Nissho Corporation, Osaka, Japan

[21] Appl. No.: 348,133

[22] Filed: May 5, 1989

Related U.S. Application Data

[63] Continuation of Ser. No. 125,318, Nov. 25, 1987, abandoned.

[30] Foreign Application Priority Data

Jan. 12, 1986 [JP] Japan ................. 61-286248

[51] Int. Cl.⁵ .............................. B32B 31/28
[52] U.S. Cl. ..................... 156/272.4; 156/274.4; 156/293; 156/308.2; 156/333; 219/10.53; 219/10.63
[58] Field of Search ............... 156/293–294, 156/272.2, 272.4, 274.4, 274.6, 274.8, 275.1, 308.2, 308.4, 333, 379.6, 379.7, 379.8, 380.2, 380.3, 380.4, 380.6; 219/10.53, 10.63, 10.81

[56] References Cited

U.S. PATENT DOCUMENTS

| | | | |
|---|---|---|---|
| 3,535,184 | 10/1970 | Schwartz | 156/274.8 |
| 3,558,397 | 1/1971 | Clark | 156/294 |
| 3,574,031 | 4/1971 | Heller, Jr. et al. | 156/273 |
| 3,663,335 | 5/1972 | Sheedy | 156/380 |
| 4,191,231 | 3/1980 | Winchell | 604/408 |

FOREIGN PATENT DOCUMENTS

| | | |
|---|---|---|
| 1124753 | 8/1968 | United Kingdom . |
| 1242943 | 8/1971 | United Kingdom . |
| 2177974A | 2/1987 | United Kingdom . |

Primary Examiner—Merrell C. Cashion, Jr.
Attorney, Agent, or Firm—Armstrong, Nikaido, Marmelstein, Kubovcik & Murray

[57] ABSTRACT

A method of welding thermoplastic resin with a high frequency welder, comprising the step of: putting an exothermic object to generate heat and an adherend made of thermoplastic resin not to be molten when high frequency waves are applied, between electrodes of a high frequency welder and thereafter generating high frequency waves between the electrodes. The method of the present invention enables to weld thermoplastic resin having a low dielectric loss which can not be welded with a high frequency welder.

1 Claim, 5 Drawing Sheets

METHOD FOR WELDING THERMOPLASTIC RESIN

This application is a continuation of application Ser. No. 125,318, filed Nov. 25, 1987, now abandoned.

BACKGROUND OF THE INVENTION

The present invention relates to a method for welding thermoplastic resin, and more particularly to a method for welding thermoplastic resin with a high frequency welder, which enables the welding of thermoplastic resin not capable of being welded by a conventional method for welding with a high frequency welder.

As conventional methods for welding thermoplastic resin having a low dielectric loss which cannot be welded with a high frequency welder, generally, there have hitherto been known a method for welding with an impulse sealer, a method for welding with a heated metallic mold and a method for welding with an ultrasonic generator.

The method for welding with an impulse sealer is a method, wherein electric current is applied to a metallic heating resistor having a flat surface to heat the resistor and sheets of thermoplastic resin causing welding by the generated heat. The above method has an advantage in that the temperature of the heating resistor can be easily adjusted. However, the above method has a disadvantage in that, for example, when a tube having low hardness is inserted between two sheets to be adhered and the tube and the sheets are welded together, the tube is sometimes deformed and the interface between the tube and the two sheets is not completely sealed and thereby a leak is generated.

The method for welding with a heated metallic mold is a method, wherein the metallic mold is heated and adherends of thermoplastic resin are welded by the generated heat to each other. The above method has an advantage that adherends having various kinds of shape can be welded to each other by processing the metallic mold so as to fit with the shape of the adherends. However, since the temperature of the heated metallic mold is influenced by the temperature of the surrounding and is sometimes lowered with repeating the above method for welding, it is difficult to control the temperature of the metallic mold. For example, in case of the temperature of the metallic mold being excessively high, the adherends are molten and deformed and show a defective appearance. Also, when the temperature of the metallic mold is low, it takes a long period of time for welding the adherends and as a result, productivity is deteriorated or sometimes the adherends are not completely and uniformly welded to each other resulting in, defective welding.

The method for welding with an ultrasonic generator is a method, wherein ultrasonic waves generated from an ultrasonic wave generator are applied to adherends of thermoplastic resin and the adherends are heated at a boundary surface of the adherends and are welded each other by vibration energy of the ultrasonic waves. The above method has advantages in that a defective appearance is not generated due to welding since only the boundary surface of the adherends is welded. Further, the adherends are easily welded to each other since the adherends are not directly heated. However, the above method has a defect in that adherends made of soft materials such as polybutadiene, low density polyethylene and styrene-butadiene elastomer are not heated and are not molten by ultrasonic waves. Thus, the method cannot be applied to adherends made of the soft materials. Also, in the case of medical containers such as bags for injection of liquids and blood bags which are particularly strictly regulated as to the particulates attached to the surface of the containers, shape, material, properties and the like and which are required for high safety and are produced with an ultrasonic wave generator, particulates are sometimes generated on the surface of the containers by the vibration of generated ultrasonic waves requiring a great deal of labor to remove the generated particulates. Still further, when the adherends are welded, the molten adherends are flown out and the burrs are sometimes formed.

It is generally known that many vinylic polymer materials such as polyolefins are less susceptible to high frequency sealing. The above conventional assembly method for blood bags of polyolefin-based polymer having adequate strength has not yet been produced.

Accordingly, the blood bags have hitherto been produced by extruding a tubular parison of material to be molded and sealing the outer end of the parison; ballooning the parison with relatively low pneumatic pressure; closing the mold chamber of the mold; and sealing the parison to form the flexible collapsible bag, including forming seal lines for the bag, by means of the mold, positioned laterally inwardly from the lateral edges of the parison as disclosed in the specification of U.S. Pat. No. 4,191,231.

As mentioned above, although there have hitherto been known various methods for welding thermoplastic resin, a method which enables to easily, uniformly and steadily weld the thermoplastic resin which cannot be welded by a conventional method with a high frequency welder has not yet been developed.

The present inventor has made studies to solve the above-mentioned problems and to develop a method which can easily, uniformly and steadily weld thermoplastic resins such as polyolefin series resin and acryl-butadiene-styrene resin which cannot be welded with a high frequency welder. As the results of his research, he has eventually found the above method and the present invention has been accomplished.

These and other objects of the present invention will become apparent from the description hereinafter.

SUMMARY OF THE INVENTION

According to the present invention, there is provided a method for welding thermoplastic resin with a high frequency welder, comprising the step of: putting an exothermic object to generate heat and an adherend made of thermoplastic resin not to be molten when high frequency waves are applied, between electrodes of a high frequency welder and thereafter generating high frequency waves between the electrodes.

DETAILED DESCRIPTION

The method of the present invention is a novel method for welding thermoplastic resin with a high frequency welder which is unexpected in the prior art in that a thermoplastic resin having a low dielectric loss cannot be welded with a high frequency welder. The method of the present invention makes it possible, for the first time, to easily, uniformly and rigidly weld adherends made of thermoplastic resin having a low dielectric loss which can not be welded with a high frequency welder to each other. Further, according to the method of the present invention, since adherends are welded to each other in a shortened period of time, that is, in about 3 to 10 seconds, it can be said that the method of the present invention is excellent in mass production.

According to the method of the present invention, adherends made of thermoplastic resin which are not welded by high frequency waves can be welded by inserting an exothermic object which is heated with a high frequency welder and the adherends between electrodes of a high frequency welder and then generating high frequency waves between the electrodes.

Examples of a material used for an exothermic object which generates heat, when high frequency waves are applied, are, for instance, a resin such as polyamide, polyamide-imide, polyvinyl chloride, polyvinylidene chloride, polyurethane, acetylcellulose, ethylene-vinyl acetate copolymer containing vinyl acetate in a content of 8 to 35% by weight or chlorine-containing fluoropolymer such as polychlorotrifluoroethylene, cardboard, cotton cloth, and the like. In addition, in case that thermal resistance is required for the exothermic object, there can be used, for example, a fiber-reinforced resin such as fibrous glass reinforced nylon, fibrous glass reinforced polyurethane, and fibrous glass reinforced polyethylene telephthalate, a crosslinked resin such as crosslinked polyvinyl chloride or crosslinked ethylene-vinyl acetate copolymer or a chlorine-containing synthetic rubber such as chloroprene rubber, epichlorohydrin rubber, chlorosulfonated polyethylene or chlorinated polyethylene. Among the above-mentioned exothermic objects, soft vinyl chloride resin and chlorine-containing synthetic rubber are preferably used since the soft vinyl chloride resin has high flexibility and is cheap and disposable and the chlorine-containing synthetic rubber can be repeatedly employed.

The shape of an exothermic object is properly selected in accordance with the shape of adherends and can be in any shape, for example, a shape like a flat plate or a cylinder, and the like. Further, if necessary, a metallic mold having a desired shape can be provided on the electrode of a high frequency welder and an exothermic object can be mounted on the metallic mold.

As a resin which can be used for an adherend, a thermoplastic resin having a low dielectric loss, which cannot be welded with a high frequency welder such as polythethylene, polypropylene, polybutadiene, styrene-butadiene elastomer, polystyrene, acrylonitrile-butadiene-styrene terpolymer or ethylene copolymer, is exemplified. However, the present invention is not limited to the above exemplified ones and other thermoplastic resins having a low dielectric loss can be employed. In case that ethylene-vinyl acetate copolymer is employed as an ethylene copolymer, it is preferable that the content of the vinyl acetate is not more than 6% by weight.

In the present invention, any type of a high frequency welder can be used if the high frequency welder is conventionally used when thermoplastic resin having a high dielectric loss is welded, and the present invention is not limited to the type or kind of the welder. Desired frequency and power of the high frequency welder cannot be absolutely determined since the conditions for welding adherends depend on the size and kind of the adherends. In general, it is preferable that the frequency and power of the welder are properly controlled to be in a range of 10 to 100 MHz and in a range of 50 W to 100 KW, respectively.

The purpose for providing an exothermic object between electrodes of a high frequency welder is that when high frequency waves are applied between the electrodes, the exothermic object is heated and thereby the adherends are welded. It is known that the calorific value of an adherend heated by high frequency waves is proportional to the dielectric constant and dielectric loss tangent and that the dielectric loss tangent is increased by heating the adherend. Accordingly, the adherend can be welded with a high frequency welder since the dielectric loss of the adherend is increased by the large increase of dielectric loss tangent of the adherends in addition to the heat of an exothermic object.

There can be employed exothermic objects having various kinds of constructions to be provided between the electrodes in the present invention. Examples of the constructions are explained by the following drawings.

Figure 1:
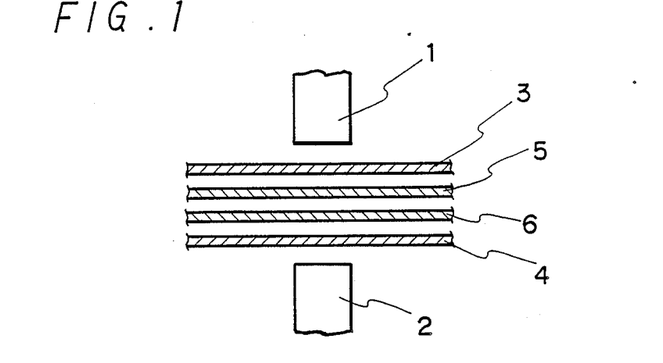
FIG. 1 to FIG. 8 are drawings explaining a method for welding thermoplastic resin in accordance with the present invention.
Figure 2:
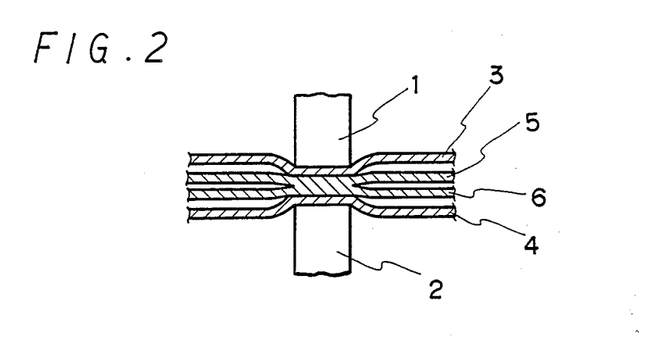

FIG. 1 and FIG. 2 are schematic drawings explaining an embodiment of the method for welding of the present invention. Exothermic objects 3 and 4 having a sheet form are provided between electrodes 1 and 2, and adherends 5 and 6 having a sheet form are disposed between the exothermic objects 3 and 4.

In FIG. 1, in case that the adherends 5 and 6 can be easily welded by the heat which is generated from one of the exothermic objects 3 and 4, only one of the exothermic objects 3 and 4 can be used. However, in case that there is a necessity to increase the calorific value of the generated heat and to shorten the required period of time for welding, it is preferable that both exothermic objects 3 and 4 are employed at the same time.

The exothermic objects 3 and 4 and the adherends 5 and 6 which are constructed as shown in FIG. 1 are lightly pressed by the electrodes 1 and 2 as shown in FIG. 2 so that the adherends 5 and 6 are not ruptured or broken by the electrodes 1 and 2 when the adherends 5 and 6 are welded together. Then high frequency waves are generated between the electrodes 1 and 2, the exothermic objects 3 and 4 are heated and thereby the adherends 5 and 6 are heated and welded to be united in a body. The required period of time for generating high frequency waves between the electrodes 1 and 2 to weld the adherends 5 and 6 cannot be absolutely determined since the period of time depends on the kinds and thickness of the exothermic objects and the adherends and on the power and frequency of high frequency waves. In case that, for instance, soft vinyl chloride films having a thickness of 0.3 mm are employed as the exothermic objects 3 and 4, low density polyethylene films having a thickness of 0.2 mm are employed as the adherends 5 and 6, electric voltage of 200 V and current of 0.3 A are applied between the electrodes 1 and 2 with a high frequency welder having a power of 4 KW and a frequency of 46 MHz and the adherends 5 and 6 are welded in the width of 5 mm and the length of 200 mm, it takes for about 5 seconds to unite the adherends 5 and 6 in a body. That shows that the method for welding of the present invention enables welding of adherends in a very shortened period of time.

Figure 3:
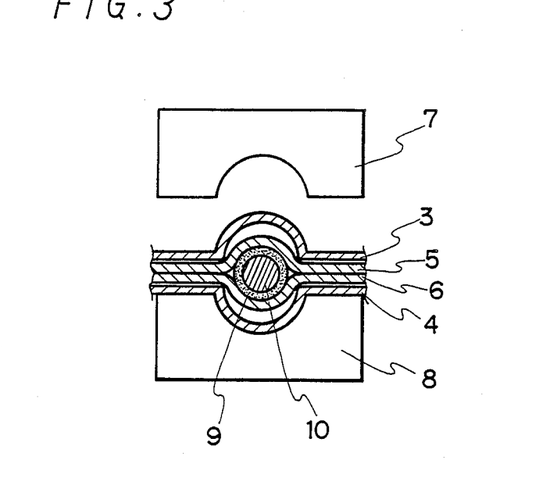
Figure 4:
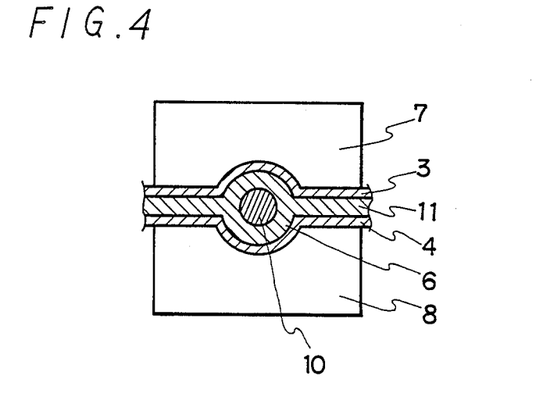

FIG. 3 is a schematiq drawing explaining another embodiment of the method for welding of the present invention wherein exothermic objects 3 and 4 which are beforehand formed to have a desired form are provided between metallic molds 7 and 8 mounted on electrodes, and then adherends 5 and 6 having a sheet form and a tubular adherend 9 in which a cylindrical metal mold 10 is inserted at the center portion are disposed, between the exothermic objects 3 and 4. In FIG. 3, the adherends 5, 6 and 9 are heated and welded to be united in a body by the process that the exothermic objects 3 and 4 and the adherends 5, 6 and 9 are lightly pressed by the metallic molds 7 and 8 and high frequency waves are generated between the metallic molds 7 and 8 to give a welded product shown in FIG. 4.

Figure 5:
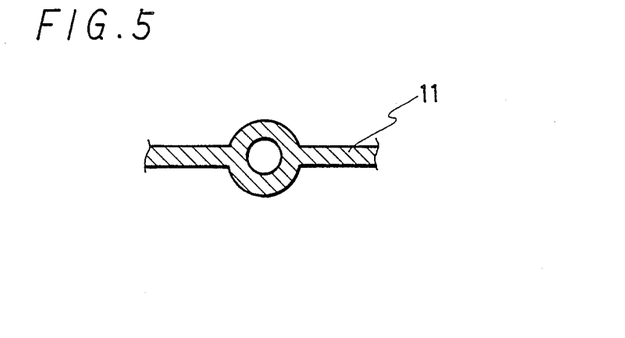

After the welded product 11 which was produced by the above process is taken out from the metallic molds 7 and 8 and the metallic mold 10 is removed from the welded product 11, the welded product 11 having a form shown in FIG. 5 is obtained.

In the welding method of the present invention, since materials of exothermic objects are different from that of adherends, the exothermic objects and the adherends are not welded together when the adherends are welded. Accordingly, the exothermic objects can be easily separated from the adherends after the adherends are welded to unit in a body.

Figure 6:
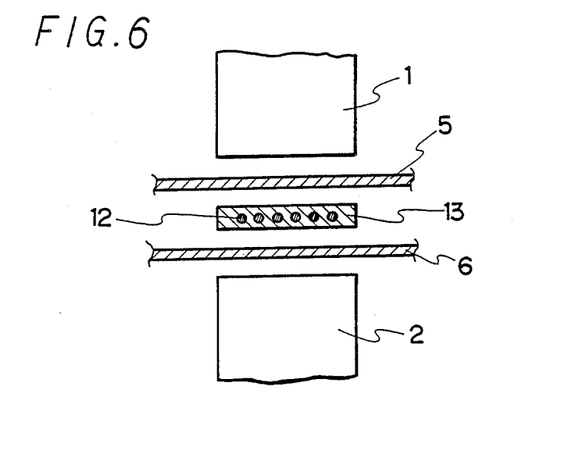
Figure 7:
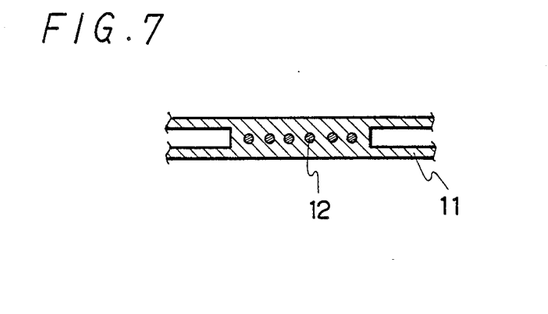

FIG. 6 is a schematic drawing explaining another embodiment of the welding method of the present invention wherein adherends 5 and 6 having a sheet form are disposed between electrodes 1 and 2 and adherend 13 in which an exothermic object 12 is embedded is disposed between the adherends 5 and 6. In FIG. 6, the adherends 5, 6 and 13 are heated and welded to be united in a body by the process that the electrodes 1 and 2 are deposited so as to shorten the distance between the electrodes 1 and 2, the adherends 5, 6 and 13 are lightly pressed with the electrodes 1 and 2 and then high frequency waves are generated between the electrodes 1 and 2 to give a welded product shown in FIG. 7.

Figure 8:
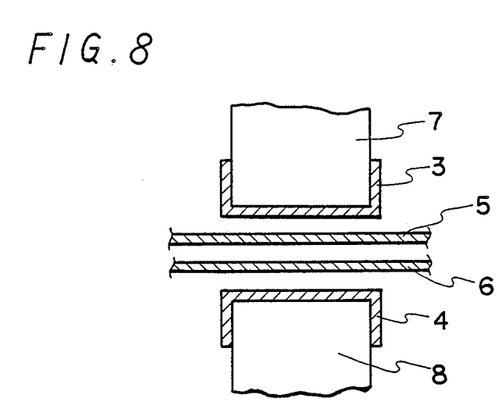

Also, so that the process that adherends are repeatedly welded can be employed, exothermic objects 3 and 4 can be mounted on electrodes or on metallic molds 7 and 8 as shown in, e.g., FIG. 8. In this case, it is preferable that as a resin used for the exothermic object, a resin excellent in thermal resistance, for example, above-mentioned fiber reinforced resin such as fibrous glass reinforced nylon, fibrous glass reinforced polyurethane or fibrous glass reinforced polyethylene terephthalate; crosslinked resin such as crosslinked polyvinyl chloride or crosslinked ethylene-vinyl acetate copolymer; chlorine-containing synthetic rubber such as chloroprene rubber, epichlorohydrin rubber or chlorosulfonated polyethylene is employed.

In accordance with the method of the present invention, a bag such as a medical container, e.g., a container for fluid or a container for preserving humors having excellent properties can be prepared.

The present invention is more specifically described and explained by means of the following Examples. However, it should be understood that the present invention is not limited to these Examples and various changes and modifications can be made in the invention without departing from the spirit and scope thereof.

EXAMPLE 1

A high frequency welder (QUEEN LIGHT ELECTRONIC INDUSTRIES LTD., Model No.: LWH 4060SB, Power: 4 KW. frequency: 46 MHz) was employed in the procedure of Example 1. Two sheets of soft vinyl chloride films (thickness: 0.3 mm) were provided as exothermic objects between electrodes of the high frequency welder. Superposed two sheets of styrene-butadiene elastomer (MK Resin, Dainippon Plastics Co., Ltd., thickness: 0.25 mm) which were employed as adherends were inserted between the exothermic objects. Electric voltage of 200V and electric current of 0.3 A were supplied to the electrodes with the exothermic objects and the adherends being lightly pressed by the electrodes, so that welding was carried out to integrate the adherends at a zone having a width of 5 mm and a length of 200 mm. It took 5 seconds for the welding.

The welded zone of the obtained integrated film of two sheets of styrene-butadiene elastomer films was transparent and uniform and had no irregularities.

Then, the peel strength of the obtained welded zone of film was measured. The measured value was as high as 5.4 Kg/15 mm width and it was confirmed that the welded film could be employed in practical uses such as a bag for food.

EXAMPLE 2

An integrated film was obtained by welding in the same manner as in Example 1 except that superposed two sheets of low density polyethylene films (thickness: 0.2 mm) were used as adherends.

The welded zone of the obtained integrated film was transparent and uniform and had no irregularities.

Then, the peel strength of the obtained welded zone of the film was measured. The measured value was as high as 5.2 Kg/15 mm width and it was confirmed that the welded film had the strength which could tolerate practical uses similar to the welded film obtained in Example 1.

EXAMPLE 3 TO 29

Integrated films were obtained by the same manner as shown in Example 1, except that the kinds of material used for adherends were changed as shown in Table 1. Each welded film had excellent appearance and each period of time for welding was in a range of 3 to 10 seconds which meant a very short period of time for welding. The results are shown in Table 1.

TABLE 1

| | Sheet of exothermic object | | Sheet of adherend | | Results | | |
|---|---|---|---|---|---|---|---|
| Ex. No. | Material | Thickness (mm) and number of sheets | Material | Thickness (mm) and number of sheets | Welding period of time (sec) | Appearance | Peel strength (Kg/cm) |
| 3 | Soft polyvinyl chloride | 0.4 2 sheets | LDPE[12] | 0.2 2 sheets | 4 | Excellent | 2.2 |
| 4 | Soft polyvinyl chloride | 0.4 2 sheets | SEBS elastomer[13] | 0.4 2 sheets | 5 | Excellent | 0.6 |
| 5 | Soft polyvinyl | 0.4 | SEBS | 0.4 | 5 | Excellent | 1.0 |

TABLE 1-continued

| | Sheet of exothermic object | | Sheet of adherend | | Results | | |
|---|---|---|---|---|---|---|---|
| Ex. No. | Material | Thickness (mm) and number of sheets | Material | Thickness (mm) and number of sheets | Welding period of time (sec) | Appearance | Peel strength (Kg/cm) |
| | chloride | 2 sheets | elastomer[13'] | 2 sheets | | | |
| 6 | Soft polyvinyl chloride | 0.25 2 sheets | Polybutadiene[14] | 0.2 2 sheets | 3 | Excellent | 1.3 |
| 7 | Polyurethane[1] | 0.4 2 sheets | LDPE | 0.2 2 sheets | 4 | Excellent | 2.0 |
| 8 | Polyurethane | 0.4 2 sheets | LDPE | 0.05 2 sheets | 3 | Excellent | 0.7 |
| 9 | Ethylene-vinyl acetate resin[2] | 0.4 2 sheets | LDPE | 0.05 2 sheets | 5 | Excellent | 0.7 |
| 10 | Saturated polyester resin[3] | 0.3 2 sheets | LDPE | 0.05 2 sheets | 8 | Excellent | 0.6 |
| 11 | Nylon 6[4] | 0.2 2 sheets | LDPE | 0.05 2 sheets | 4 | Excellent | 0.7 |
| 12 | Cardboard | 0.5 1 sheet | LDPE | 0.05 2 sheets | 5 | Excellent | 0.7 |
| 13 | Cardboard | 0.5 2 sheets | LDPE | 0.2 2 sheets | 10 | Excellent | 2.1 |
| 14 | Cotton cloth | 0.25 2 sheets | LDPE | 0.05 2 sheets | 10 | Excellent | 0.6 |
| 15 | Chlorotrifluoro-ethylene[5] | 0.3 2 sheets | LDPE | 0.03 2 sheets | 10 | Excellent | 0.4 |
| 16 | Soft polyvinyl chloride | 0.4 2 sheets | Polypropylene[15] | 0.15 2 sheets | 6 | Excellent | 1.9 |
| 17 | polyvinylidene-chloride[6] | 0.2 2 sheets | LDPE | 0.05 2 sheets | 4 | Excellent | 0.6 |
| 18 | Acetyl-cellulose[7] | 0.2 2 sheets | LDPE | 0.05 2 sheets | 5 | Excellent | 0.5 |
| 19 | Chloroplene rubber[8] | 1.0 2 sheets | LDPE | 0.05 2 sheets | 10 | Excellent | 0.7 |
| 20 | Chlorosulfonated polyethylene[9] | 1.0 2 sheets | LDPE | 0.05 2 sheets | 10 | Excellent | 0.6 |
| 21 | Epichlorohydrin rubber[10] | 1.0 2 sheets | LDPE | 0.05 2 sheets | 8 | Excellent | 0.6 |
| 22 | Chlorinated polyethylene[11] | 1.0 2 sheets | LDPE | 0.05 2 sheets | 9 | Excellent | 0.6 |
| 23 | Soft polyvinyl chloride | 0.3 2 sheets | ABS resin[16] | 0.05 2 sheets | 5 | Excellent | 1.2 |
| 24 | Soft polyvinyl chloride | 0.3 2 sheets | Polystyrene resin[17] | 0.05 2 sheets | 5 | Excellent | 1.3 |
| 25 | Soft polyvinyl chloride | 0.3 2 sheets | Propylene-ethylene copolymer[18] | 0.15 2 sheets | 5 | Excellent | 1.6 |
| 26 | Soft polyvinyl chloride | 0.3 2 sheets | Ethylene-α-olefin copolymer[19] | 0.05 2 sheets | 4 | Excellent | 0.7 |
| 27 | Soft polyvinyl chloride | 0.3 2 sheets | Ethylene-vinylacetate copolymer[20] | 0.2 2 sheets | 4 | Excellent | 1.2 |
| 28 | Soft polyvinyl chloride | 0.3 2 sheets | Ethylene-methacrylic acid copolymer[21] | 0.05 2 sheets | 4 | Excellent | 0.7 |
| 29 | Soft polyvinyl chloride | 0.3 2 sheets | Styrene-butadiene resin[22] | 0.05 2 sheets | 4 | Excellent | 1.2 |

(Note)
[1] Available from Kasei Up John Company Ltd. as a commercial name of Pellethane 2363-80A
[2] Available from Mitsui Polychemical Company, Ltd. as a commercial name of P-2805
[3] Available from Kanebo, LTD. as a commercial name of IFG-8L
[4] Available from MITSUBISHI PETRO CHEMICAL COMPANY, LTD
[5] Available from DAIKIN INDUSTRIES, LTD as a commercial name of CTFE
[6] Available from Asahi Chemical Industry Co., Ltd.
[7] Available from Taihei Chemicals Co., Ltd.
[8] Available from SHOWA NEOPRENE Co., Ltd.
[9] Available from E. I. Du Pont de Nemours & Co. as a commercial name of Hypalon
[10] Available from Osaka Soda Co., Ltd. as a commercial name of EPICHLOMER
[11] Available from Osaka Soda Co., Ltd. as a commercial name of DAISOLAC
[12] Low density polyethylene available from SHOWA DENKO K.K. as a commercial name of M-112
[13] Styrene-ethylene-butylene-styrene block copolymer elastomer available from MITSUBISHI PETRO CHEMICAL COMPANY, LTD as a commercial name of ME-800C
[13'] Styrene-ethylene-butylene-styrene block copolymer elastomer available from ARON KASEI CO., Ltd. as a commercial name of AR-800C
[14] Available from Japan Synthetic Rubber Co., Ltd. as a commercial name of RB-820
[15] Available from Sumitomo Chemical Company, Limited as a commercial name of Noblen FS-1012
[16] Available from DENKI KAGAKU KOGYO KABUSHIKI KAISHA as a commercial name of DENKA ABS-HM
[17] Available from DENKI KAGAKU KOGYO KABUSHIKI KAISHA as a commercial name of DENKA STYROL TP-URX
[18] Available from Sumitomo Chemical Company, Limited as a commercial name of Sumitomo Noblen S131
[19] Available from Sumitomo Chemical Company, Limited as a commercial name of SUMIKATHENE L FA-101
[20] Available from Mitsui Polychemical Company, Ltd. as a commercial name of EVAFLEX P-0607
[21] Available from Mitsui Polychemical Company, Ltd. as a commercial name of HI-MILAN
[22] Available from Asahi Chemical Industry Co., Ltd. as a commercial name of ASAFLEX 800

EXAMPLE 30

A high frequency welder which was used in Example 1 was employed. Two sheets of soft vinyl chloride films (thickness: 0.3 mm) were provided as heating resistors between electrodes of the high frequency welder. One end of a polyethylene inflation film (thickness: 0.2 mm) which was employed as an adherend was inserted between the heating resistors. Electric voltage of 200V and electric current of 0.3 A were supplied to the electrodes with the heating resistors and the adherends being pressed lightly by the electrodes, so that welding was carried out to integrate the end of adherends within a zone having a width of 5 mm and a length of 200 mm.

Figure 9:
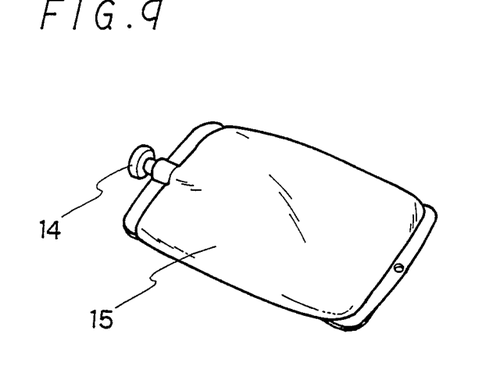
FIG. 9 is a perspective view of a bag for injection having a port obtained in Example 30 of the present invention.

Next, a tubular port made of polyethylene (inside diameter 15 mm, outside diameter: 18 mm), in which a metallic mold was inserted, was inserted into another end of the inflation film, and the inflation film and a tubular port containing a core mold were inserted between electrode molds having desirable shapes. Then, electric voltage of 200V and electric current of 0.3 A were supplied to the electrode molds and the port and the films were integrated to give a bag having a port for injection (content volume: 500 ml). FIG. 9 is a perspective view of the obtained bag having a port for injection. In FIG. 9, the numeral 14 is a port and the numeral 15 is a bag having a port for injection.

The welded zone of the obtained bag having a port for injection was transparent and uniform and had no irregularities.

Then, pressure test (air pressure: 0.7 kg/cm$^2$) was carried out by introducing air to the bag having a port for injection and it was confirmed that any leakage or any other abnormality was not observed. Further, the bag having a port for injection was filled with 500 ml of water and was dropped from an elevation of one meter. However, any damage such as rupture was not observed.

EXAMPLE 31

A high frequency welder which was used in Example 1 was employed. Two sheets of soft vinyl chloride films having a thickness of 0.4 mm which were employed as heating resistors were disposed between electrode molds having prescribed shapes which were provided in the high frequency welder and then two sheets made of styrene-ethylene-butylene-styrene block copolymer (hereinafter referred to as SEBS) elastomer which was available from Dainippon Plastics Co., Ltd. as a commercial name of MK resin MK-3S were inserted between the two sheets of soft vinyl chloride films. Then, two tubes having an inside diameter of 5 mm and outside diameter of 7 mm and one blood-collecting tube having an inside diameter of 3 mm and outside diameter 4.5 mm made of SEBS elastomer were disposed between the two sheets. Electric voltage of 200V and electric current of 0.3 A were supplied to the electrode mold for about 7 seconds to integrate the sheets, the port covers and the blood-collecting tube.

Figure 10:
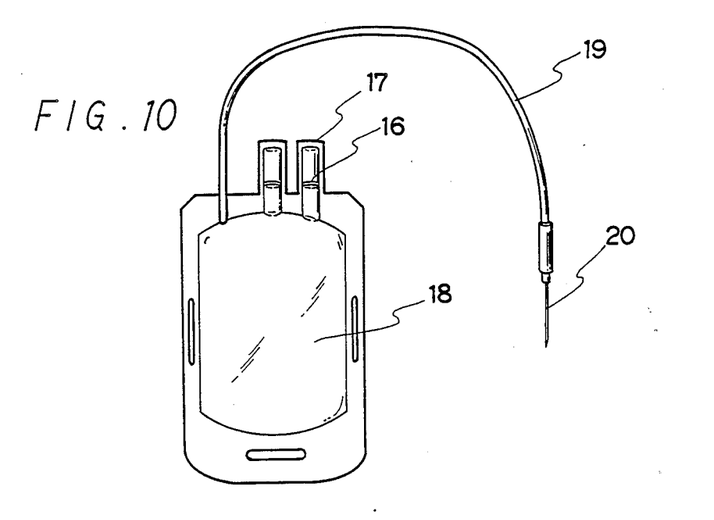
FIG. 10 is a perspective view of a blood bag obtained in Example 31 of the present invention.

Then, two unwelded superposed sheets were welded at the periphery in the same manner as mentioned above for about 7 seconds to give a blood bag having a content volume of 230 ml. FIG. 10 is a perspective view of the obtained bag for blood. In FIG. 10, the numeral 17 is a port cover which covers a membrane tube 16, the numeral 18 is a bag for blood, the numeral 19 is a blood-collecting tube and the numeral 20 is a blood-collecting needle.

Then, an air leak test, a centrifugal test and a pressure test were carried out in accordance with the standard for construction of blood bags made of polyvinyl chloride regulated in Notification No. 448 of the Ministry of Welfare, Japan. The results of the tests are shown in Table 2.

TABLE 2

| Item of test | Criteria for judging | Results |
| --- | --- | --- |
| Air leak test | No leak is observed at 0.4 Kg/cm$^2$. | Pass |
| Centrifugal test | No leak of content liquid is observed after 20 min. at 2500 rpm. | Pass |
| Pressure test | No leak of content liquid is observed at 0.7 Kg/cm$^2$. | Pass |

It is obvious from the results shown in Table 2 that the bag obtained in Example 31 satisfies the above cited standard for construction of blood bags made of polyvinyl chloride.

As mentioned above, the method for welding thermoplastic resin of the present invention can easily and uniformly weld thermoplastic resin having a low dielectric loss, which has been thought to be impossible by welding with a high frequency welder, in a shortened period according to time. Further, the method for welding of the present invention makes it possible for a port made of thermoplastic resin having a low handness, to be inserted between two sheets of adherends, and uniformly and rigidly welded together without bending the port or generating a leak. Further, according to the present invention, bags which are strictly regulated as to shape, material and property and which are required for high safety such as a bag having a port for injection or a storaging container for medical liquid or humor can be easily produced.

Still further, according to the method for welding of the present invention, a container such as a container made of polypropylene which is conventionally produced by blow molding can be easily produced in a shortened period of time without using the large scale requirement of a metallic mold.

In addition to the ingredients used in the examples, other ingredients can be used in the examples as set forth in the specification to obtain substantially the same results.

What is claimed is;

1. A method of manufacturing a medical bag formed by joining a medical bag, defined by thermoplastic resin sheets, with a tubular port wherein both said sheets and said port are made of a thermoplastic resin not capable of being molten by application of high frequency-wave energy, comprising the steps of:
    inserting a core mold for high frequency welding within the tubular port;
    inserting said tubular port between the sheets defining an opening into said bag;
    placing exothermic objects, which generate heat when applied with high frequency-wave energy selected from the group consisting of cardboard and cotton cloth, on the outer sides of said sheets;
    fitting the tubular port, the sheets and the exothermic objects between electrodes adapted to accommodate the shape of the tubular port, and for high frequency welding;
    welding sheets to the outside of the tubular port by applying high frequency-wave energy to the mold; and
    removing the exothermic objects from the medical bag after high frequency-wave energy is applied.

* * * * *

UNITED STATES PATENT AND TRADEMARK OFFICE
CERTIFICATE OF CORRECTION

PATENT NO. : 4,950,347

DATED : August 21, 1990

INVENTOR(S) : Hitoshi FUTAGAWA

It is certified that error appears in the above-identified patent and that said Letters Patent is hereby corrected as shown below:

On the cover page, Item [30], "Jan. 12, 1986" should read --Dec. 1, 1986--.

Signed and Sealed this

Third Day of December, 1991

Attest:

HARRY F. MANBECK, JR.

*Attesting Officer*                *Commissioner of Patents and Trademarks*